United States Patent [19]
Morris

[11] 3,716,130
[45] Feb. 13, 1973

[54] VARIABLE VOLTAGE RESILIENT CONNECTING ROD DRIVE

[75] Inventor: John M. Morris, Louisville, Ky.

[73] Assignee: Rex Chainbelt Inc., Milwaukee, Wis.

[22] Filed: April 15, 1971

[21] Appl. No.: 134,497

Related U.S. Application Data

[63] Continuation of Ser. No. 786,286, Dec. 23, 1968, abandoned.

[52] U.S. Cl. ........................................198/220 DA
[51] Int. Cl. ..............................................B65g 27/18
[58] Field of Search ................. 198/220 DA, 220 DB

[56] References Cited

UNITED STATES PATENTS 3,019,889   2/1962   Carrier ........................ 198/220 DA
3,251,457   5/1966   Dumbaugh .................... 198/220 DB

*Primary Examiner*—Robert G. Sheridan
*Attorney*—Marshall and Yeasting

[57] ABSTRACT

A vibratory conveyor trough supported on resilient means to form a vibratory system having a resonant frequency is driven by an eccentric shaft and connecting rod resiliently coupled to the conveyor trough. The eccentric shaft, which may be fitted with a flywheel, is driven by a squirrel cage induction motor the speed of which is varied by adjustment of the voltage applied to the motor.

7 Claims, 6 Drawing Figures

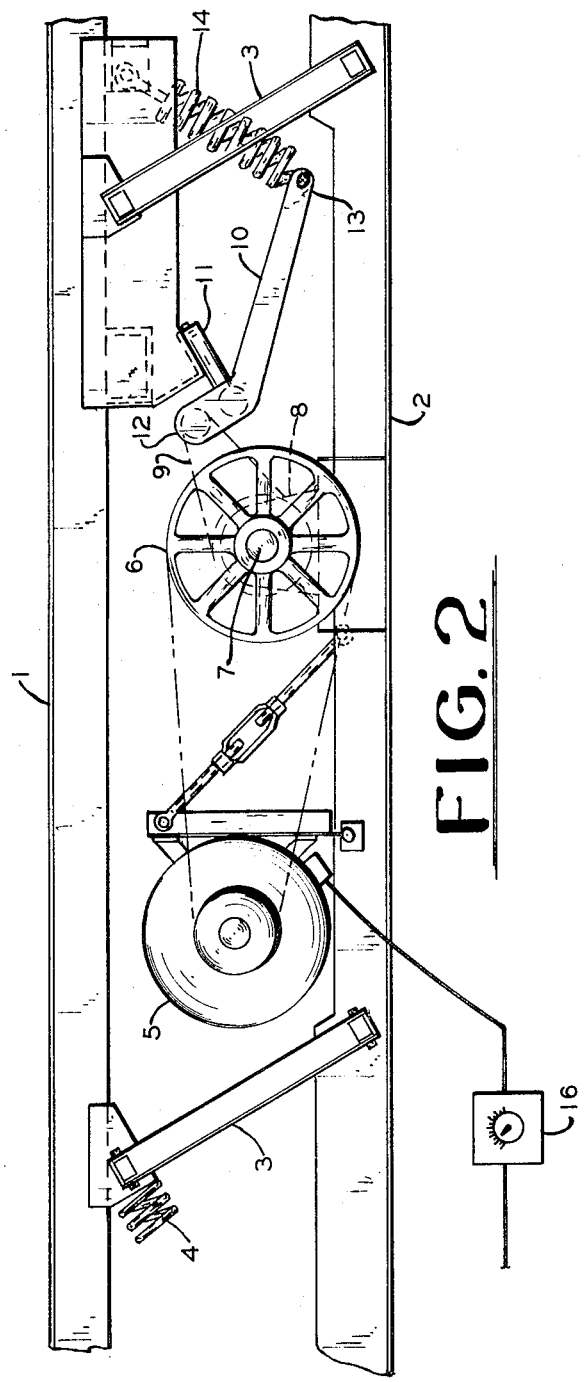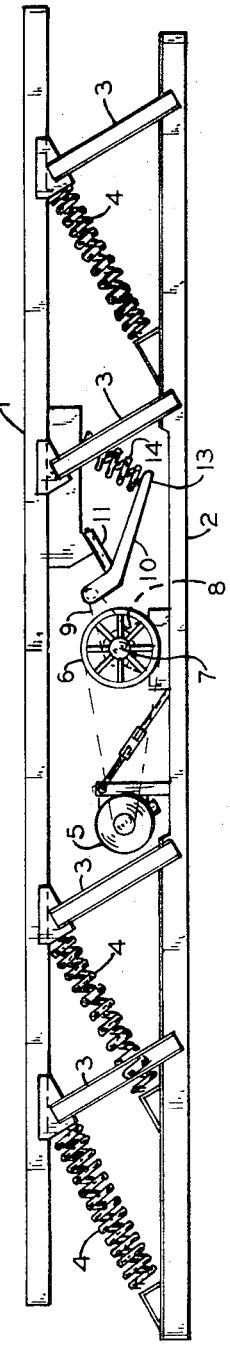
INVENTOR.
JOHN M. MORRIS
BY Marshall & Yeasting
ATTORNEYS

INVENTOR.
JOHN M. MORRIS
BY Marshall & Yeasting
ATTORNEYS

VARIABLE VOLTAGE RESILIENT CONNECTING ROD DRIVE

REFERENCE TO RELATED APPLICATION

This application is a continuation of application Ser. No. 786,286, filed Dec. 23, 1968, now abandoned.

SUMMARY OF THE INVENTION

This invention relates to the control of the stroke and frequency of a vibratory conveyor driven by a fixed stroke eccentric and in particular to tuning the vibratory conveyor to resonance on its support springs at a desired operating frequency and driving it from a fixed stroke eccentric through a resilient coupling that resiliently yields as the speed of operation departs from the resonant frequency of the conveyor trough on its support springs. The speed of operation is adjusted by varying the voltage applied to a squirrel cage induction motor driving the fixed stroke eccentric.

A conveyor constructed and operated according to the invention may be used to advantage as a combined conveyor-feeder where a hopper or other material supply is located at some distance from the receiving apparatus. In such an arrangement the conveyor trough carries material at a depth determined by the hopper opening and at a speed determined by the adjustable drive. Any change in demand may be promptly answered by a speed change of the conveyor which instantly changes the rate of flow of material off the discharge end of the conveyor. This is a substantial improvement over a conventional feeder supplying material to a conveyor at a controlled rate which conveyor in turn carries the material to the receiver. In this prior system there is no change in feed rate at the receiver until the material has traveled the length of the conveyor. This time lag leads to hunting in the control system. The improved system, by varying the conveying speed rather than the feed into the conveyor, avoids the time lag.

The improved controlled speed conveyor can also be used to advantage when material is being treated during conveying. The treatment may comprise any desired process such as, for example, heating, cooling or drying. By varying the conveyor speed the retention time of the material in the processing zone may be easily controlled, either automatically according to the condition of the product leaving the zone or manually under the control of a supervising operator.

The principal object of the invention is to provide an eccentric drive vibratory device in which the frequency of operation is adjustable over a substantial range by varying the voltage applied to a squirrel cage induction motor driving the device.

Another object of the invention is to provide an eccentric drive, tuned vibratory device in which the stroke and frequency of operation are varied by varying the voltage applied to a squirrel cage induction motor driving the device.

These and other objects and advantages are obtained in a vibratory device such as a vibratory conveyor illustrated in the accompanying drawings.

BRIEF DESCRIPTION OF THE DRAWINGS

FIG. 1 is a side elevation of a conveyor incorporating the invention.

FIG. 2 is a fragmentary enlarged side elevation of the drive portion of the conveyor illustrated in FIG. 1.

DESCRIPTION OF THE PREFERRED EMBODIMENT

Figure 3:
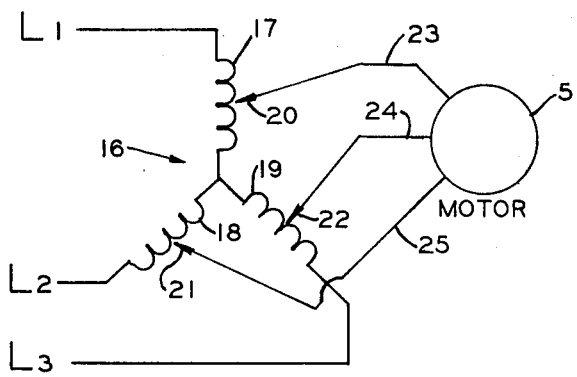
FIG. 3 is a simplified wiring diagram showing one method of control of the voltage applied to the induction driving motor in the drive mechanism of the conveyor.

These specific figures and the accompanying description are intended merely to illustrate the invention and not to impose limitations on its scope.

Referring to FIG. 1, a conveyor according to the invention comprises a trough or work member 1 supported from a base 2 by a plurality of cantilever leaf springs 3 and coil springs 4. The cantilever leaf springs 3 may be replaced by links or pivoted struts if desired.

The conveyor trough is vibrated in a direction parallel to the length of the coil springs 4 by a drive mechanism comprising an AC induction motor 5 that is belt connected to a pulley 6 on an eccentric shaft 7 that is journaled on a pedestal 8 erected from the base 2. The eccentric shaft 7 is connected through a connecting rod 9 and lever 10 to a bracket 11 attached to and depending from the trough 1.

As may be seen in greater detail in FIG. 2, the lever 10, which is fulcrumed on the bracket 11, has a short arm or end 12 pivotally connected to the connecting rod 9 and has its long arm or end 13 connected through a drive spring 14 to the trough 1. The connecting rod 9, in combination with the lever 10 and spring 14, forms a resilient drive connection from the eccentric shaft 7 to the conveyor trough 1. In this arrangement it is preferable to use rubber bushings at the fulcrum for the lever 10 as well as in the connections at each end of the connecting rod 9. These rubber bushings also contribute to the resiliency of the drive.

As will be explained later, the velocity of the vibratory movement of the trough 1 and thus its conveying speed may be varied by varying the speed of the drive motor 5. The drive motor is preferably an alternating current squirrel cage induction motor and its speed is controlled by varying the voltage applied to its stator. Several voltage control systems are available. One arrangement, as shown in FIG. 3, comprises a three phase variable autotransformer 16 that has its three windings 17, 18, and 19 connected in wye between power lines L1, L2, and L3. Brushes 20, 21, and 22 that contact the windings 17, 18, and 19 are connected through leads 23, 24, and 25 to the motor 5.

This system of control is satisfactory if the load on the conveyor is reasonably constant and if the required speed range is relatively small. The extent of the controllable speed range with this arrangement may be increased by using a motor with a high resistance rotor commonly known as a NEMA-D design for the drive motor. With such a motor a full range of speed may be obtained with reasonable speed stability by varying the voltage applied through the transformer 16 to the motor. The speed range available with this manual control through the variable transformer when using a motor with the common or ordinary low resistance rotor design, commonly known as the NEMA-B design, is often limited to operation at speeds above the so-called breakover or stalling speed occuring at between 80 per cent and 60 per cent of synchronous speed, because of the reverse slope of the speed-torque curve of the motor.

Figure 4:
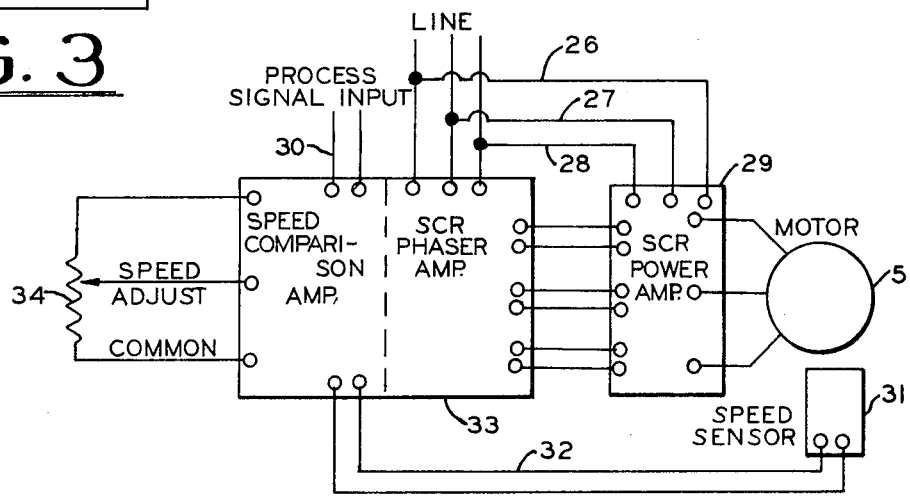
FIG. 4 is a block diagram of a preferred system for controlling the voltage and thus the speed of the induction motor used to drive the conveyor.

These limitations of the manual transformer control may be avoided as well as providing a control responsive to ordinary process signals by using the arrangement illustrated in FIG. 4. In this arrangement power from a power line is fed through leads 26, 27, and 28 and a three-phase silicon controlled rectifier circuit identified as the SCR power amplifier 29. This amplifier controls the flow of current from the power line to the motor 5 in accordance with signals received from a process monitoring device through leads 30. The process signal coming over the leads 30 is compared with the speed of the motor 5 as measured by a speed sensor 31 connected through leads 32 to a speed comparison amplifier. The difference signal between these two inputs is amplified and applied to a three phase phaser amplifier 33 and used to control the firing times of the SCRs in the SCR power amplifier 29. Provision is also made in the speed comparison amplifier for manual control by way of a potentiometer 34 so that in the absence of a process signal the operator of the equipment may adjust the motor speed merely by adjusting the potentiometer.

In this arrangement, which is described in detail in U.S. Pat. No. 3,434,586, the speed sensor 31 comprises a small alternating current generator which may be a reluctance generator or a generator comprising a coil cooperating with a permanent magent carried by the motor shaft which generates an alternating signal proportional to speed. This signal is rectified and filtered to provide a direct voltage between the leads 32 which, in the speed comparison amplifier, is compared with the DC voltage from the process signal on leads 30 or a voltage derived from the speed control potentiometer 34. The difference voltage is amplified in the comparison amplifier and used to control the timing of control pulses relative to the power line voltage. The control pulses are transmitted from the phaser amplifier to the power amplifier to control the time in each cycle that the corresponding silicon controlled rectifier become conducting to apply power to the motor.

The conveyor and its drive in the arrangement shown in FIGS. 1 and 2 is designed and constructed so that the amplitude of vibration of the conveyor trough 1 preferably varies with the speed of operation of the motor. While some control of conveying speed may be obtained merely by varying the speed of the motor with a constant amplitude of vibration, it is preferable, in order to reduce the stresses in a long conveyor to operate the system at its natural frequency, and to use a resilient drive from the eccentric shaft to the conveyor so that the amplitude of vibration varies as the operating frequency departs from the natural frequency of the conveyor. The tuned system comprises the conveyor trough 1, the coupling springs 4 and the cantilever guide springs 3, together with the base 2. The base 2 may either be designed to be bolted directly to a rigid foundation or it may be made quite heavy and mounted on isolating springs to reduce the reaction forces transmitted to the foundation. In either case the spring rate of the combination of the springs 4 and the cantilever guides 3 is selected so that the system is resonant at some selected operating frequency usually in the range from 400 to 900 cycles per minute.

Figure 5:
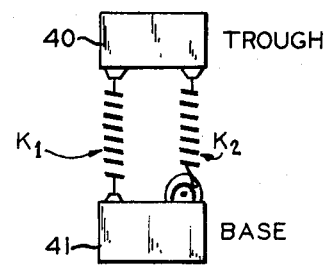
FIG. 5 is a diagram in the nature of a mathematical model illustrating the principal components of the vibratory system.
Figure 6:
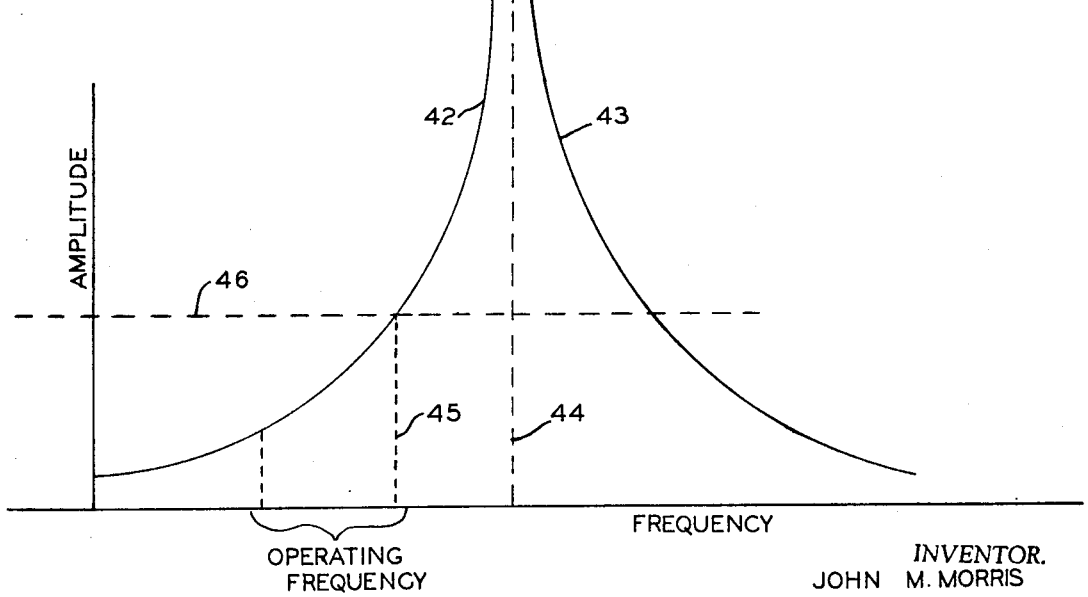
FIG. 6 is a graph showing the relationship between the amplitude of vibration of the work member of the conveyor and the operating frequency in a system operating according to the invention.

This much of the system is represented in a mathematical model, FIG. 5, in which the mass of the trough 1 is represented by the block 40 while the mass of the base 2 is indicated by the block 41. These, together with the coupling spring K1, form the principal vibratory system. The spring rate of the entire system, however, is modified by a spring K2 representing the spring effect of the drive system including the lever 10 and the driving spring 14 as well as the rubber bushings included in the connections from the connecting rod to the lever and from the lever to the bracket 11 connected to the trough 1. The overall spring rate is the sum of the two individual spring rates and, according to the invention, is selected to give an overall natural frequency that is somewhat higher, for safety reasons, than the maximum operating speed of the motor 5. This is indicated in FIG. 6 by the rapid increase in amplitude of vibration as the resonant frequency is approached as indicated by curves 42 and 43. These are located one below and one above the natural frequency of the system indicated by the dotted line 44. Without the drive spring the vibrating system of the trough 1, coupling springs 4, and base 2 is resonant at a lower frequency such as is indicated by line 45 in FIG. 6. At this lower frequency, the vibrating system has its least impedance; that is, it vibrates through a given stroke with the least amount of driving force. If there are no losses in the system, the required driving force is very small and may be supplied from the eccentric by way of the lever 10 carried on a bracket 11 without appreciable deformation of the drive spring 14. In this case, the amplitude of vibration of the trough corresponds to the throw of the eccentric of the eccentric shaft 7 and is indicated by a line 46 in FIG. 6. If the speed of operation of the motor 5 is reduced from the speed or natural frequency indicated by the line 45, the vibratory system appears as a spring load driven by the resilient drive system. The stroke or motion of the eccentric transmitted through the connecting arm 9 is then divided, part in deflection of the resilient drive system and part in movement of the trough on the support springs 3 and 4. In this case the amplitude of vibration of the trough decreases to a value less than the stroke of the eccentric as indicated by that portion of the curve 42 lying to the left of the line 45. This speed range is marked "operating frequency" in FIG. 6. Conversely, if the motor is operated at a higher speed such that the frequency of operation is greater than that indicated by the line 45 the vibratory system, comprising the trough, the support springs 3 and 4 and the base, appears as a mass and the stroke of the trough then increases over that indicated by the line 46 as indicated by the rising portion of the curve 42 to the right of the line 45.

For best regulation of conveying speed with load variation the operating speed range of the motor 5 is selected so that at full voltage the system operates at a frequency near that represented by the line 45, the condition in which the amplitude of vibration of the trough 1 is practically the same as the stroke of the eccentric shaft 7. This is the condition for the least bearing load on the eccentric shaft and a minimum of force transmitted through the lever 10, and is the most efficient method of operation of the conveyor. While the system may be operated at a higher frequency and somewhat greater amplitude of vibration, such operation is not commercially desirable because the regulation of the system, i.e. the change in amplitude of vibration with changes in load, becomes relatively large. Better regulation is achieved by designing the system to operate in the range including and extending downwardly from the frequency indicated by the line 45.

While the greatest efficiency of operation and greatest response to changes in motor speed may be achieved by operating at a frequency at which the basic system of trough, base, and support springs is resonant there is only a small loss in efficiency and some loss in sensitivity to speed change in operating at lower speeds. The loss in efficiency occurs because of the higher forces that are transmitted through the eccentric shaft and coupling to the trough and, to a minor extent, the reaction of the alternating torque on the eccentric shaft as the shaft eccentric passes dead center with a load on the connecting rod. The alternating torque causes cyclical load fluctuations on the motor 5 thus somewhat decreasing its efficiency in converting electrical power to mechanical power. These motor losses, while small, may be further reduced by making the pulley 6 in the form of a flywheel so that the alternating torque on the eccentric shaft 7 resulting from the connecting rod 9 working against a spring load or a mass load results in very small cyclical speed changes of the motor 5 and thus small changes in power developed in the motor.

It is common practice to use ball or roller bearings for the eccentric shaft, both for supporting the shaft and in the connecting rod to minimize friction losses at these points. Because in ordinary construction, there is an alternating force in the connecting rod such bearings must be made with extremely close tolerances to avoid lost motion and resulting impact as the connecting rod force reverses during each stroke. This reversal of force may be eliminated by arranging the relative initial loads on the springs 4 and 14 so that an initial bias force is applied to the drive with the result that the net force in the connecting rod never changes sign. In this manner, the clearance in the bearing is kept in the same direction all of the time.

The principles of the invention may be applied to any vibrating equipment in which two members, one carrying an eccentric shaft connected to the other through a resilient connecting rod system, are connected by resilient means to form a resonant system having a natural or resonant frequency near the operating speed and a squirrel cage motor supplied with adjustable voltage is used to drive the eccentric shaft.

I claim:

1. In a vibratory apparatus for doing work, in combination, a work member, a second member, resilient means connecting said work member to to said second member and cooperating with the members to form a vibratory system having a natural frequency, an eccentric shaft journaled in one of said members, a connecting rod journaled on the eccentric shaft, a spring mounted on the other of said members, means operatively connecting said spring to said connecting rod such that all of the force exerted by said connecting rod is applied to said other member and is controlled in amount by the deflection of said spring, said means and said spring forming a resilient drive from the connecting rod to said other member, and means for driving said eccentric shaft at a frequency in the range below said natural frequency whereby the deflection of the resilient drive plus the relative amplitude of vibration of the work member with respect to the second member equals the eccentricity of the eccentric shaft and said relative amplitude of vibration decreases as the operating speed of the eccentric shaft is decreased.

2. A vibratory apparatus according to claim 1 in which a flywheel is included on the eccentric shaft.

3. A vibratory apparatus according to claim 1 in which a flywheel is included on the motor shaft.

4. A vibratory apparatus according to claim 1 in which the resilient means connecting the members produces a bias force between the members greater than the alternating component of force in the connecting rod drive.

5. A vibratory apparatus according to claim 1 in which the variable voltage means comprises a variable autotransformer.

6. A vibratory apparatus according to claim 1 in which the variable voltage means comprises a controlled semi-conductor rectifier circuit.

7. A vibratory apparatus according to claim 6 in which the controlled rectifier circuit includes a motor speed sensing circuit.

* * * * *